(12) United States Patent
Pausch et al.

(10) Patent No.: US 9,777,771 B2
(45) Date of Patent: Oct. 3, 2017

(54) ANTIFRICTION BEARING CAGE

(71) Applicant: Schaeffler Technologies AG & Co. KG, Herzogenaurach (DE)

(72) Inventors: Michael Pausch, Dittelbrunn (DE); Tobias Hock, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/102,045

(22) PCT Filed: Nov. 3, 2014

(86) PCT No.: PCT/DE2014/200616
§ 371 (c)(1),
(2) Date: Jun. 6, 2016

(87) PCT Pub. No.: WO2015/086007
PCT Pub. Date: Jun. 18, 2015

(65) Prior Publication Data
US 2016/0305481 A1    Oct. 20, 2016

(30) Foreign Application Priority Data

Dec. 10, 2013  (DE) .................. 10 2013 225 339

(51) Int. Cl.
| F16C 33/44 | (2006.01) |
| --- | --- |
| F16C 33/38 | (2006.01) |
| F16C 19/06 | (2006.01) |
| F16C 19/26 | (2006.01) |
| F16C 33/46 | (2006.01) |

(52) U.S. Cl.
CPC .......... *F16C 33/3856* (2013.01); *F16C 19/06* (2013.01); *F16C 19/26* (2013.01); *F16C 33/44* (2013.01); *F16C 33/4635* (2013.01); *F16C 2208/58* (2013.01); *F16C 2208/82* (2013.01); *F16C 2212/08* (2013.01)

(58) Field of Classification Search
CPC ....... F16C 33/3831; F16C 33/44; F16C 33/56
See application file for complete search history.

(56) References Cited

U.S. PATENT DOCUMENTS

| 3,567,504 A * | 3/1971 | Hopkins et al. ..... C08K 3/0033 |
| --- | --- | --- |
| | | 156/184 |
| 3,733,110 A | 5/1973 | Davis |
| 3,744,862 A | 7/1973 | Schwartz |
| 4,541,739 A | 9/1985 | Allen et al. |
| 5,752,773 A | 5/1998 | Rosado et al. |

(Continued)

FOREIGN PATENT DOCUMENTS

| DE | 102004058518 | 6/2006 |
| --- | --- | --- |
| DE | 102006007925 | 8/2007 |

(Continued)

*Primary Examiner* — Thomas R. Hannon
(74) *Attorney, Agent, or Firm* — Volpe and Koenig, P.C.

(57) ABSTRACT

An antifriction bearing cage is disclosed including cage pockets that are used for guiding rolling elements, in particular balls, and are formed by two lateral rings having a common axis of symmetry (R) and by webs interconnecting the lateral rings. The lateral rings are designed as single pieces along with the webs and contain a fabric. The fabric is composed of at least two types of different fibers which impart highly anisotropic properties to the fabric.

11 Claims, 2 Drawing Sheets

(56) References Cited

U.S. PATENT DOCUMENTS

| | | | | |
|---|---|---|---|---|
| 5,880,043 | A * | 3/1999 | Lorenz | B32B 27/04 |
| | | | | 384/300 |
| 6,513,981 | B2 * | 2/2003 | Ooitsu | F16C 33/44 |
| | | | | 29/898.067 |
| 2008/0279496 | A1 | 11/2008 | Moesle | |
| 2013/0182987 | A1 * | 7/2013 | Himeno | C08G 73/10 |
| | | | | 384/523 |

FOREIGN PATENT DOCUMENTS

| | | |
|---|---|---|
| DE | 102009032961 | 1/2011 |
| EP | 2623802 | 8/2013 |
| JP | 2000154826 | 6/2000 |

* cited by examiner

ANTIFRICTION BEARING CAGE

BACKGROUND

The invention relates to an anti-friction bearing cage, for example, ball bearing cage that contains a fabric and is suitable, in particular, for use in a spindle ball bearing.

An anti-friction bearing cage that contains fibers or a fabric is known, for example, from DE 10 2004 058 518 A1. The fibers that can be contained in the anti-friction bearing cage can be cotton fibers, glass fibers, carbon fibers, aramid fibers, and boron fibers. The anti-friction bearing cage also contains an additive for reducing the coefficient of friction, for example, a solid lubricant or a low-viscosity oil. The anti-friction bearing cage can be produced by saturating a fabric in a mixture made from epoxy resin and solid lubricant and the saturated fabric is formed into a tubular prepreg. The prepreg is then hardened in a temperature range from 120° C. to 180° C. and is processed into the shape of the anti-friction bearing cage. The anti-friction bearing cage according to DE 10 2004 058 518 A1 should be suitable, in particular, for industrial spindle ball bearings and for the medical industry, especially dental technology.

Another anti-friction bearing cage that contains fibers is known, for example, from DE 10 2009 032 961 A1. This anti-friction bearing cage can be produced by injection molding and can comprise different types of fibers, wherein, in addition to glass fibers, carbon fibers, and aramid fibers, also PTFE fibers are mentioned. An embedding of a fabric into the cage is not provided. A synthetic material in which the fibers are distributed can be, for example, a polyetheretherketone (PEEK), polyphenylene sulfide (PPS), polyethersulfone (PES), or polyetherimide (PEI).

From DE 10 2006 007 925 A1, an anti-friction bearing constructed as a single-row angular contact ball bearing is known for supporting a machine tool main spindle. A cage of this anti-friction bearing is constructed as a synthetic or hard-fabric cage. In both cases, the cage can be guided on the outer bearing ring of the anti-friction bearing.

SUMMARY

The invention is based on the objective of further developing an anti-friction bearing cage that contains a fabric and is suitable, in particular, for use in a spindle ball bearing, for example, a machine tool, with respect to the cited prior art, especially in terms of wear resistance and suitability for extreme use conditions.

This objective is achieved according to the invention by an anti-friction bearing cage and by an anti-friction bearing having such an anti-friction bearing cage, in particular, spindle ball bearing.

The anti-friction bearing cage is constructed as a ball bearing cage or roller bearing cage and has, in a known basic construction, two lateral rings that are connected to each other integrally by a number of connecting pieces, forming cage pockets, wherein a continuous fabric is contained in the entire arrangement made from lateral rings and connecting pieces. The anti-friction bearing cage can be constructed as a cage of a pure radial bearing, namely a radial ball bearing or radial roller bearing, likewise as a cage of an angular contact ball bearing. The rolling elements guided in the cage can be balls or cylindrical rollers. Outer rim guidance, inner rim guidance, or rolling element guidance of the cage can be provided.

According to the invention, the fabric is constructed from at least two types of different fibers, wherein the different fibers differ from each other in terms of their material composition as well as their mechanical properties.

While a first type of fiber is selected, for example, primarily with respect to its mechanical load carrying capacity and stiffness, another type of fiber also contained in the fabric can be optimized, for example, with respect to lubrication properties. Here, either the fibers themselves have lubricating properties or bind especially well to lubricant, for example, an oil.

Preferably, the different fibers of the fabric have a different arrangement from each other in the fabric. Here, for example, a first type of fiber is oriented predominantly or completely in the circumferential direction of the anti-friction bearing cage, while a second type of fiber is oriented at least predominantly in the axial direction of the anti-friction bearing. Here, in the preferred construction, the fibers oriented mainly in the circumferential direction have a higher tensile strength than the fibers oriented mainly in the axial direction. The specific breaking strength, also called breaking length, is preferably higher in the fibers of the anti-friction bearing cage lying in the circumferential direction than in the fibers oriented in the axial direction.

The anti-friction bearing cage can contain either one type of fiber or multiple types of fibers both in the circumferential direction and also in the axial direction. For example, the following combinations are possible:
  The fabric contains exactly one type of fiber in the circumferential direction and different types of fibers in the axial direction.
  The fabric contains exactly one type of fiber in the axial direction and multiple, different types of fibers in the circumferential direction.
  The fabric contains multiple types of fabrics in the circumferential direction and multiple types of fibers in the axial direction.

The fibers used to form the fabric can be synthetic fibers or also natural fibers. Here, in the same direction, there can be only natural fibers, only synthetic fibers, or both synthetic and also natural fibers. This applies both to the fibers running in the circumferential direction, that is, in the warp direction, and also to the fibers running in the axial direction of the anti-friction bearing cage, that is, in the weft direction.

According to one possible construction, the fibers running in the circumferential direction are synthetic fibers and the fibers running in the axial direction are natural fibers. The synthetic fibers can be, in particular, aramid fibers, basalt fibers, boron fibers, glass fibers, carbon fibers, PET (polyethylene terephthalate) fibers, and/or PTFE (polytetrafluoroethylene) fibers in the fabric of the anti-friction bearing cage. Natural fibers suitable for forming the fabric are, for example, bamboo fibers, cotton fibers, flax fibers, hemp fibers, jute fibers, ramie fibers, and sisal fibers.

One possible combination of synthetic fibers and natural fibers in the fabric includes, for example, the combinations of aramid/cotton and carbon/cotton. Here, the fabric in the circumferential direction is made from at least 20% synthetic fiber, that is, aramid fibers with respect to carbon fibers, while only cotton fibers are used as the fibers running in the axial direction. Likewise, cotton forms the remaining percentage of fibers adding up to 100% in the circumferential direction if the fibers running in the circumferential direction are not exclusively aramid or carbon fibers.

The fabric can be embedded in any composition into a thermoplastic or duroplastic synthetic matrix. Suitable matrix materials are, in particular, epoxy resin or phenol resin. In the scope of producing the anti-friction bearing cage, the fabric can be initially saturated and wound in the matrix material, in order to obtain a sleeve-shaped prepreg that is then further processed, wherein the further processing includes cutting machining steps.

The fibers of the fabric running in the circumferential direction of the anti-friction bearing cage have, in the preferred construction, in comparison to the fibers running in the axial direction, not only a higher tensile strength, but also a higher modulus of elasticity. In contrast, the coefficient of thermal expansion of the fibers running in the circumferential direction is preferably lower than the coefficient of thermal expansion of the fibers of the fabric running in the axial direction. Thus, neither high thermal nor mechanical loads, namely centrifugal forces, lead to a strong expansion of the anti-friction bearing cage. The anti-friction bearing cage is thus usable in a wide temperature range even if there is little clearance between the cage and bearing outer ring.

The strongly direction-dependent properties of the fabric of the anti-friction bearing cage also allow a very filigree cage construction in comparison with the prior art. This makes possible useful structural freedoms for the construction of the entire anti-friction bearing, for example, with respect to the arrangement and cross-sectional shape of sealing elements.

BRIEF DESCRIPTION OF THE DRAWINGS

An embodiment of the invention is explained in more detail below with reference to the accompanying drawings. Shown are.

DETAILED DESCRIPTION OF THE PREFERRED EMBODIMENTS

Figure 1:
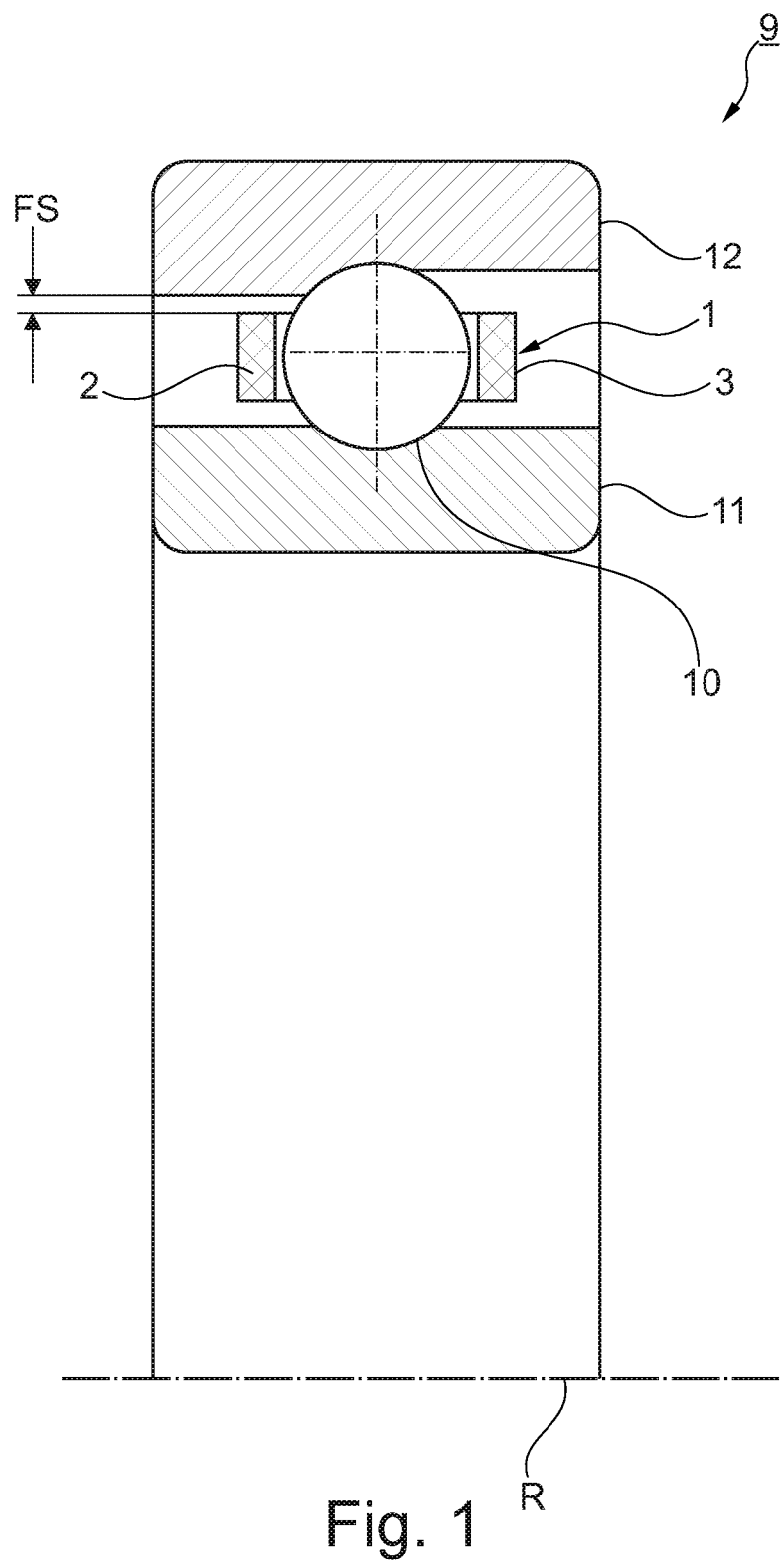
FIG. 1 a spindle ball bearing constructed as an angular contact ball bearing in a section view, and FIG. 2 a fabric contained in the cage of the anti-friction bearing according to FIG. 1 in a schematic view.

An anti-friction bearing cage 1 is provided for guiding rolling elements 10, namely balls, of an anti-friction bearing marked overall with the reference symbol 9. The ball bearing 9 is constructed as a single-row angular contact ball bearing and is used as a fast-running spindle ball bearing in a machine tool. In terms of the principle function of the anti-friction bearing 9, reference is made to the prior art cited above, in particular, DE 10 2006 007 925 A1.

The balls 10 of the anti-friction bearing 9 roll on bearing rings 11, 12, namely an inner ring 11 and an outer ring 12. The rotational axis of the ball bearing 9 identical with the axis of symmetry of the anti-friction bearing cage 1 is designated with R. The anti-friction bearing cage 1 is an outer rim-guided cage, wherein, between the outer periphery of the anti-friction bearing cage 1 and the inner periphery of the outer ring 12, a guidance clearance FS is given. Alternatively, the anti-friction bearing cage 1 is guided in a not shown way also by the rolling elements 10 or by the inner ring 11, that is, as a rolling element-guided or inner rim-guided cage.

Each rolling element 10 of the ball bearing 9 is guided in a cage pocket 5 of the anti-friction bearing cage 1. The walls of the cage pockets 5 can have cylindrical shapes, as can be seen in FIG. 1. Alternatively, the cage pockets 5 could have spherically shaped surfaces. In each case, the anti-friction bearing cage 1 has two closed lateral rings 2, 3, wherein connecting pieces 4 extend between and are connected integrally to these lateral rings 2, 3, forming the cage pockets 5. The connecting pieces 4 and cage pockets 5 are provided with reference numbers only in FIG. 2 for the sake of clarity, although only a part of the anti-friction bearing cage 1 is visible in this representation.

Figure 2:
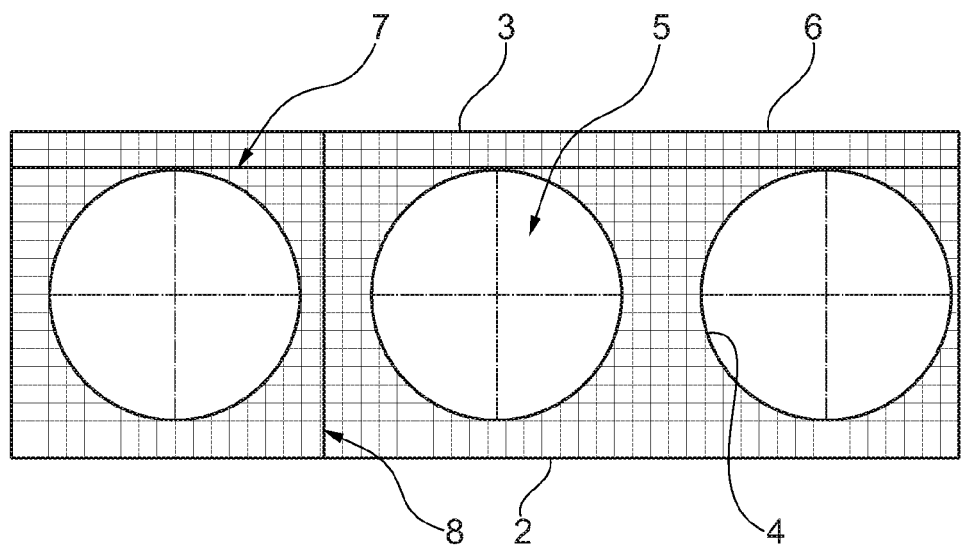

The anti-friction bearing cage 1 is constructed from a fabric 6 that is embedded in a plastic matrix made from epoxy resin or phenol resin. The fabric 6 shown symbolically in FIG. 2 is constructed from fibers 7 running in the warp direction, that is, in the circumferential direction of the anti-friction bearing cage 1, and fibers 8 running in the weft direction, that is, in the axial direction of the anti-friction bearing cage 1. The fibers 7, 8 differ from each other greatly in terms of their composition and mechanical properties, so that the fabric 6 has extremely anisotropic properties.

The fibers 7 running in the circumferential direction are high-strength synthetic fibers, for example, carbon fibers, or a mixture of different fibers designed for high tensile strength. For example, the fibers 7 running in the circumferential direction are a combination of two or three different types of fibers. The fibers 7 are selected in each case such that a rotation of the anti-friction bearing cage 1 leads to merely a slight expansion of the anti-friction bearing cage 1 and thus associated reduction of the guidance clearance FS, even at high rotational speed characteristic values of the ball bearing 9. The associated possible design of the ball bearing 9 with low guidance clearance FS ensures that, in each rotational speed range, there can be, at most, low eccentricity of the anti-friction bearing cage 1, which would lead to centrifugal and friction forces.

In comparison with the forces acting in the tangential direction of the anti-friction bearing cage 1, the anti-friction bearing cage 1 is exposed to only relatively low forces in the axial direction even for operation at high rotational speeds. Accordingly, the fibers 8 of the fabric 6 running in the axial direction are not selected primarily from the aspect of tensile strength. Instead, homogeneous or mixed fibers are selected as the fibers 8 running in the weft direction of the fabric 6, which provides for good lubrication properties of the anti-friction bearing cage 1. In the embodiment, these are cotton fibers that are distinguished by good lubricant storage capacities.

Due to the combination of different fibers 7, 8 in the same fabric 6, the anti-friction bearing cage 1 has a significantly more filigree construction with simultaneously increased load capacity and service life in comparison with conventional cages of spindle ball bearings.

LIST OF REFERENCE NUMBERS

FS Guidance clearance
R Rotational axis
1 Anti-friction bearing cage
2 Lateral ring
3 Lateral ring
4 Connecting piece
5 Cage pocket
6 Fabric
7 Fiber running in circumferential direction
8 Fiber running in axial direction
9 Ball bearing
10 Rolling element, ball
11 Inner ring
12 Outer ring

The invention claimed is:

1. An anti-friction bearing cage comprising cage pockets that are provided for guiding rolling elements and are formed by two lateral rings having a common axis of symmetry (R), connecting pieces connecting said lateral rings to define the cage pockets, wherein the lateral rings are formed integrally with the connecting pieces and contain a fabric, and the fabric is constructed from at least two types of different fibers, wherein the different types of fibers are contained in the fabric in a different arrangement from each other.

2. The anti-friction bearing cage according to claim 1, wherein the fabric contains a first type of the fiber that is oriented predominantly in a circumferential direction of the lateral rings and a second type of the fiber that is oriented predominantly in an axial direction.

3. The anti-friction bearing cage according to claim 2, wherein the fibers oriented predominantly in the circumferential direction have a higher tensile strength than the fibers oriented predominantly in the axial direction.

4. The anti-friction bearing cage according to claim 3, wherein synthetic fibers are provided as the fibers oriented in the circumferential direction and natural fibers are provided as the fibers oriented in the axial direction.

5. The anti-friction bearing cage according to claim 4, wherein the fibers oriented in the circumferential direction are selected from the group consisting of aramid fibers, basalt fibers, boron fibers, glass fibers, carbon fibers, PET fibers, and PTFE fibers.

6. The anti-friction bearing cage according to claim 4, wherein the fibers oriented in the axial direction are selected from the group consisting of bamboo fibers, cotton fibers, flax fibers, hemp fibers, jute fibers, ramie fibers, and sisal fibers.

7. The anti-bearing bearing cage according to claim 2, wherein fibers oriented in the circumferential direction have a lower coefficient of thermal expansion than the fibers oriented in the axial direction.

8. An anti-friction bearing comprising a number of rolling elements and an anti-friction bearing cage according to claim 1.

9. The anti-friction bearing according to claim 8, wherein balls are provided as the rolling elements.

10. The anti-friction bearing according to claim 9, wherein the bearing is a spindle ball bearing.

11. The anti-friction bearing according to claim 8, wherein cylindrical rollers are provided as the rolling elements.

* * * * *